(12) United States Patent
Smyth et al.

(10) Patent No.: US 11,800,209 B1
(45) Date of Patent: Oct. 24, 2023

(54) FRAME STRUCTURE WITH RAISED REGIONS TO IMPROVE CAMERA RELIABILITY

(71) Applicant: Apple Inc., Cupertino, CA (US)

(72) Inventors: Nicholas D Smyth, San Jose, CA (US); Hiran R Rathnasinghe, Fremont, CA (US); Nitin Kumar Chennupati, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/469,696

(22) Filed: Sep. 8, 2021

(51) Int. Cl.
*H04N 23/54* (2023.01)
*G02B 7/09* (2021.01)
*H04N 23/51* (2023.01)

(52) U.S. Cl.
CPC ............. *H04N 23/54* (2023.01); *G02B 7/09* (2013.01); *H04N 23/51* (2023.01)

(58) Field of Classification Search
CPC ....... H04N 5/2253; H04N 5/2252; G02B 7/09
See application file for complete search history.

(56) References Cited

U.S. PATENT DOCUMENTS

| | | | | |
|---|---|---|---|---|
| 8,314,841 | B2 * | 11/2012 | Chiu | G03B 5/00 348/374 |
| 9,019,423 | B2 | 4/2015 | Seol et al. | |
| 10,447,907 | B2 * | 10/2019 | Vehkaperä | H04N 5/2252 |
| 10,690,998 | B2 | 6/2020 | Hong et al. | |
| 10,924,644 | B2 | 2/2021 | Hwang et al. | |
| 2015/0215542 | A1 * | 7/2015 | Nomura | G02B 27/646 348/208.11 |
| 2017/0374248 | A1 * | 12/2017 | Eromaki | H04N 5/2257 |
| 2018/0352128 | A1 * | 12/2018 | Wang | B29C 43/36 |
| 2019/0020822 | A1 * | 1/2019 | Sharma | H04N 5/2253 |
| 2019/0075223 | A1 * | 3/2019 | Chen | H04N 5/2253 |
| 2019/0235202 | A1 * | 8/2019 | Smyth | H04N 5/2257 |
| 2019/0342991 | A1 * | 11/2019 | Hasegawa | H04N 5/2253 |
| 2020/0096782 | A1 * | 3/2020 | Miller | G02B 27/646 |
| 2020/0106962 | A1 * | 4/2020 | Smyth | H04N 5/23258 |
| 2020/0125139 | A1 * | 4/2020 | Fletcher | G06F 1/1609 |
| 2022/0094824 | A1 * | 3/2022 | Yang | H04N 23/57 |

FOREIGN PATENT DOCUMENTS

| | | |
|---|---|---|
| KR | 20170000313 | 1/2017 |
| KR | 101751132 | 6/2017 |

\* cited by examiner

*Primary Examiner* — Padma Haliyur
(74) *Attorney, Agent, or Firm* — Robert C. Kowert; Kowert, Hood, Munyon, Rankin & Goetzel, P.C.

(57) ABSTRACT

A camera may include an image sensor attached with a substrate configured to move relative to one or more lenses of the camera in one or more directions. The camera may include one or more actuators to control movement of the image sensor, which may include at least one magnet and at least one corresponding coil. The magnet of the actuators may be attached with the substrate, outside a perimeter of the substrate or on the substrate but close to the perimeter of the substrate. The magnet may cause the adjacent portion of the substrate to become cantilevered with only partial support. The camera may include a frame structure having one or more raised regions towards the magnet to reduce a stress on the cantilevered portion of the substrate, e.g., during a drop or shock event.

20 Claims, 5 Drawing Sheets

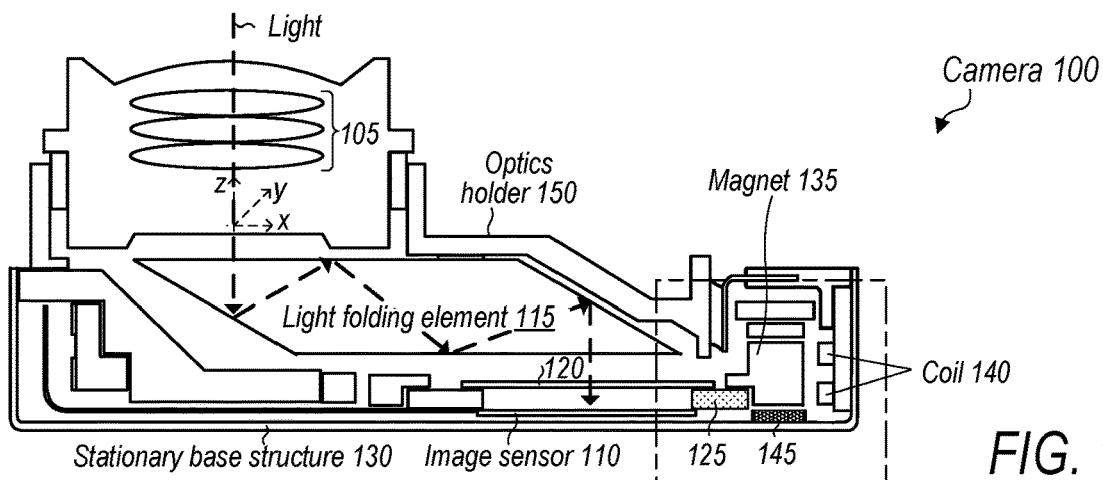
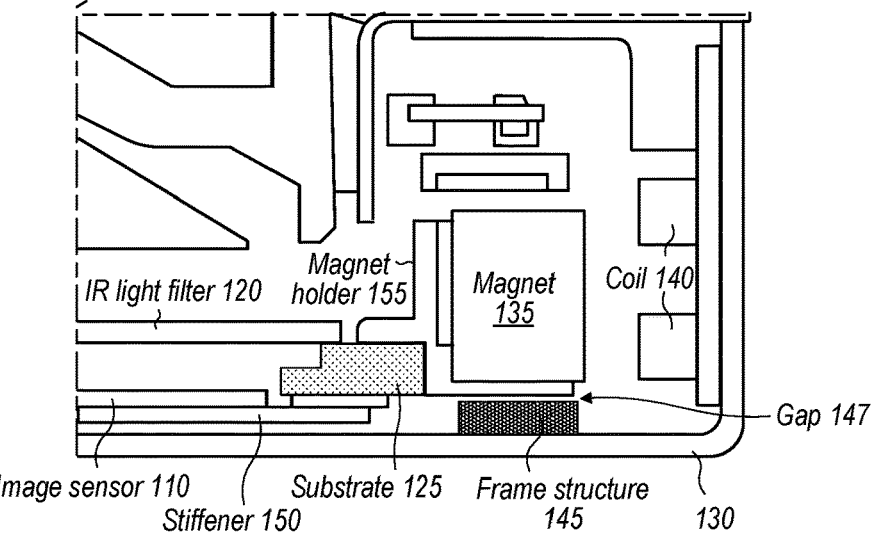
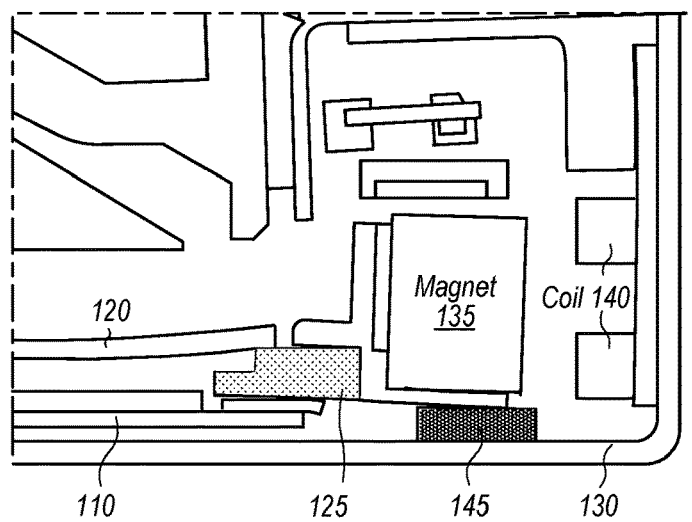
FIG. 1A
FIG. 1B
FIG. 1C

FRAME STRUCTURE WITH RAISED REGIONS TO IMPROVE CAMERA RELIABILITY

BACKGROUND

Technical Field

This disclosure relates generally to a camera and more specifically to a camera including bearing structures and using a frame structure with one or more raised regions to improve reliability.

Description of the Related Art

Mobile multipurpose devices such as smartphones, tablets, and/or pad devices are considered as a necessity nowadays. They integrate various functionalities in one small package thus providing tremendous convenience for use. Most, if not all, of today's mobile devices include at least one camera. Some cameras may incorporate a sensor-shift design that allows an image sensor to move relative to a lens of the cameras in order to implement various camera functions. For instance, some cameras may sense and react to external excitation/disturbance by adjusting location of an image sensor relative to a lens of the camera in an attempt to compensate for unwanted motion of the lens. Furthermore, some cameras may incorporate an autofocus (AF) mechanism whereby the object focal distance between an image sensor and a lens can be adjusted to focus an object plane in front of the camera at an image plane to be captured by the image sensor.

Sometimes, a camera may use a bearing structure to provide movability for the image sensor. For instance, the image sensor may be mounted to a substrate, and the camera my use a bearing structure to suspend the substrate (and the image sensor) from a stationary structure, such that the substrate (and the image sensor) can ride on the rolling elements of the bearing structure to move in a specific direction. Sometimes, a camera may use an actuator to control movement of the image sensor, and some components of the actuator, e.g., a magnet, may be also affixed with the substrate. However, a drop or shock event of a mobile may subject the substrate and its associated mounting components to unwanted movement. Sometimes, a mounting component such as the magnet may be mounted on the substrate outside a perimeter of or close to an edge of the substrate, and thus cause this portion of the substrate to be cantilevered with only partial support. The unwanted movement of the component can produce an excessive stress on the substrate and may even cause it to crack. Therefore, it is desirable to have a solution to address the issue to improve the camera reliability.

BRIEF DESCRIPTION OF THE DRAWINGS

FIGS. 1A-1C shows an example camera including a frame structure with raised regions, according to some embodiments.

Figure 2:
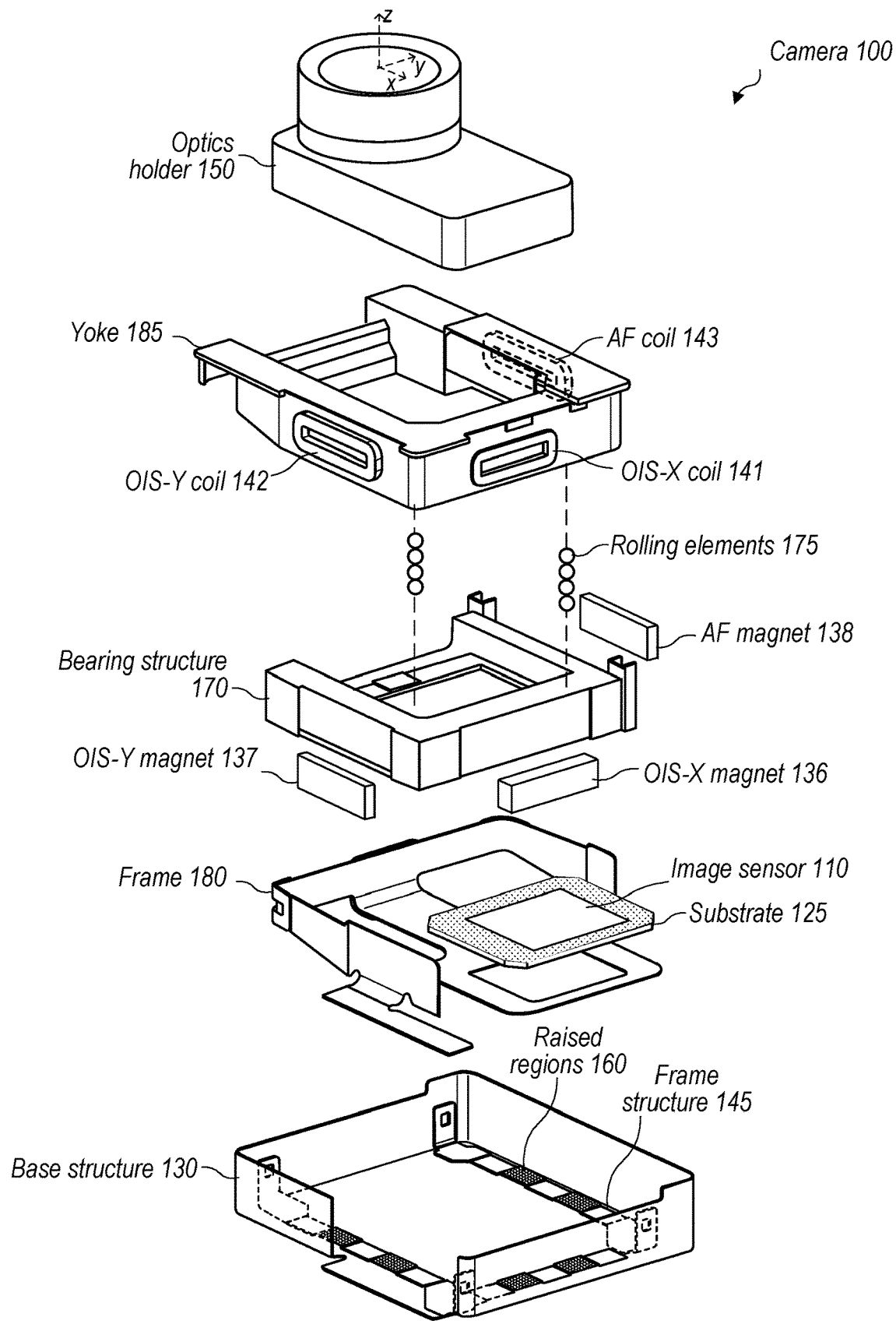
FIG. 2 shows an exploded view an example camera, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a camera that may use a frame structure with raised regions to improve reliability. In some embodiments, the camera may include one or more lenses and an image sensor. The one or more lenses may pass through light from an external environment into the camera. The image sensor may receive the light and accordingly generate image signals, e.g., electrical signature. The, and the image signals may be further processed by a processor to produce an image. In some embodiments, the camera may be integrated as part of a mobile multipurpose device such as a smartphone, table, pad device, and the like.

In some embodiments, the camera may incorporate a sensor-shift design that may allow the image sensor to move relative to the lenses to implement various camera functions. For instance, in some embodiments, the camera may have a bearing structure including one or more stages. A first stage may be suspended from a spatially fixed and stationary structure by a first group of rolling elements, such that the first stage may move on the first group of rolling elements approximately in a first direction, e.g., a direction in parallel to an optical axis of the lenses (or Z-axis) to adjust a focus distance between the image sensor and the lenses to perform autofocus (AF). In addition, in some embodiments, the bearing structure may include a second stage suspended from the first stage through a second group of rolling elements such that the second stage may be movable on the second group of rolling elements approximately in a second direction, e.g., a direction (e.g., along X-axis direction) orthogonal to the optical axis of the lenses (or Z-axis) to implement optical image stabilization (OIS) along the second direction. Further, the first and second stages (e.g., the raceways at the first and second stages for the second group of rolling elements in-between) may be designed, such that the second stage may not necessarily have a degree of movement freedom in other directions (e.g., along Z-axis). Therefore, the second stage may move together with the first stage as the first stage moves along Z-axis. Moreover, in some embodiments, the bearing structure may include a third stage suspended from the second stage through a third group of rolling elements so as to be movable approximately in a third direction, e.g., another direction (e.g., along Y-axis direction) orthogonal to the optical axis of the lenses (or Z-axis) to implement OIS in the third direction. Similarly, the bearing structure may be designed such that the third stage may move together with the second stage as the second stage moves along Y-axis, as well as moves with the first stage (and the second stage) as the first stage moves along Z-axis. In other words, the third stage may be able to move along Z, X, and/or Y-axis. In some embodiments, the image sensor of the camera may be mounted to a substrate (e.g., a ceramic or organic substrate), and the substrate may be further affixed with the third stage, whilst the lenses may be spatially fixed and stay stationary. Therefore, the image sensor and the substrate may be movable (with the third stage) relative to the lenses approximately along Z-, X-, and/or Y-axis to implement AF and/or OIS functions.

In some embodiments, the camera may use one or more actuators, such as one or more voice coil motor (VCM) actuators, to control movement of the image sensor. For instance, a VCM actuator may include one or more magnets and one or more corresponding coils. The magnets may be attached to the substrate of the image sensor, whilst the coils may be affixed with a stationary component and thus indirectly fixedly coupled with the lenses. The coils may conduct current that may electromagnetically interact with magnetic fields of the magnets to generate motive force (e.g., Lorentz force) to thus move the magnets (and the substrate and image sensor) relative to the lenses.

The movability or degrees of movement freedom however may subject the substrate and its associated mounting components to unwanted movement. For example, during a drop or shock event of a mobile device that includes the camera, the substrate and the associated mounting components may move un-purposefully in various directions. In some embodiments, a mounting component such as a magnet of the actuators may be mounted to the substrate outside a perimeter of the substrate, or still on the substrate but close to an edge of the substrate, and thus cause the adjacent portion of the substrate to be cantilevered with only partial support. During the unwanted movement, the mass of the magnet can cause an excessive stress on this cantilevered portion of the substrate. Sometimes, this can even cause the substrate to fracture and thus reliability issues to the camera.

To address the issues, the camera disclosed herein may use a frame structure with raised regions to provide support for the cantilevered portion of the substrate. In some embodiments, the frame structure may be positioned between the substrate and a stationary base structure of the camera. The frame structure may include one or more raised regions underneath the cantilevered portion of the substrate that may protrude towards the cantilevered portion of the substrate, such that a gap between the cantilevered portion of the substrate and the frame structure may be reduced. As a result, when the cantilevered portion of the substrate shakes during unwanted movement, the raised regions of the frame structure can then provide better support to hold the cantilevered portion of the substrate to mitigate stress on the substrate. This can improve reliability of the camera, without impacting the actuator functional performance or causing any significant design modifications to the camera. In some embodiments, the frame structure may be formed using one or more sheets of metal (e.g., stainless steel, copper alloy, etc.) to achieve required elasticity and strength. In some embodiments, the raised or protruding portions of the frame structure may be formed using a stamping process. For instance, a sheet of metal may be pressed by a pressing tool to create the raised regions for the metal sheet. In some embodiments, punching, blanking, bending, coining, embossing, and flanging may all be stamping techniques used to shape the metal.

FIGS. 1A-1C shows an example camera including a frame structure with raised regions, according to some embodiments. For purposes of illustration, only relevant components are displayed in the figures. FIG. 1A shows a cross-sectional view of example camera 100, whilst FIGS. 1B and 1C show zoomed-views of a portion of the camera for raised region of a frame structure at normal and drop conditions, respectively. In FIG. 1A, an optical coordinate system defined by X-Y-Z axes is also displayed for purposes of illustration, where an optical axis of lenses 105 of camera 100 is defined as the Z-axis. In FIG. 1A, camera 100 may include the one or more lenses 105, and image sensor 110. In this example, camera 100 may also include light folding element 115. In some embodiments, light folding elements 115 may be positioned optically between lenses 105 and image sensor 110. Light folding elements 115 may fold light passing through lenses 105 (e.g., by reflection at one or more surfaces of light folding element 115) for one or more times to redirect the light to image sensor 110. In this example, light folding element 115 is displayed as a parallelogrammical prism for purposes of illustration. In some embodiments, light folding element 115 may be implemented in other forms. For instance, in some embodiments, light folding element 115 may be simply a reflection mirror, a triangular prism, etc. Further, in some embodiments, camera 100 may not necessarily include a light folding element. Instead, light passing through lenses 105 may transmit to image sensor 110 without light folding or redirection. As indicated in FIG. 1A, lenses 105 and light folding element 115 (collectively referred to as optical components) may be contained in optical holder 150. In some embodiments, camera 100 may further include infrared light filter 120, placed optically between the optic components and image sensor 110, to reduce or block infrared light from reaching image sensor 110.

In some embodiments, camera 100 may have a sensor-shift structure that may allow image sensor 110 to move relative to the optical components in one or more directions. For instance, in some embodiments, image sensor 110 (and infrared filter 120) may be attached with substrate 125. Substrate 125 may be a ceramic substrate, an organic substrate, or a combination of both ceramic and organic portions. For instance, in some embodiments, substrate 125 may include a ceramic portion and an organic portion (e.g., a printed circuit board). Image sensor 110 (and infrared filter 120) may be mounted to the ceramic portion, and the organic portion may be joined with the ceramic portion and used to route wires to transfer power and/or other electrical signals from/to image sensor 110 to/from other components. In some embodiments, substrate 125 may be affixed with a bearing structure (e.g., bearing structure 170 as described in FIG. 2) that may be suspended from stationary base structure 130 via a plurality of rolling elements. In some embodiments, the bearing structure may include one or more stages that may move on the plurality of rolling elements, such that substrate 125 and image sensor 110 may be able to move in one or more directions. As described above, the movement of image sensor 110 may be used to implement various camera functions. For instance, in some embodiments, image sensor 110 may be movable relative to lenses 105 and light folding element 115 in a first direction in parallel to the optical axis of lenses 105 (or Z-axis) to perform AF. In addition, in some embodiments, image sensor 110 may be movable in one or more others directions (e.g., along X- and/or Y-axis) orthogonal to the optical axis of lenses 105 (or Z-axis) to implement OIS. Note that camera 100 is presented only as an example for purposes of illustration. In some embodiments, camera 100 may also include a lens-shift structure where lenses 105 and/or light folding element 115 may be movable relative to image sensor 110. For instance, in some embodiments, lenses 105 and/or light folding element 115 may be attached to a lens-shift structure including a bearing structure to move on some rolling elements along Z-axis to implement AF, whilst image sensor 110 may be movable along X- and/or Y-axis to perform OIS. In addition, in some embodiments, the stack-up sequence of the multiple stages of a bearing structure may be different. For instance, in some embodiments, the bearing structure may include three stages as described above, but the first stage may be able to move along X-axis, the second stage on top of the first stage may be movable along Y-axis, whilst the third stage may be configured to shift along Z-axis.

In some embodiments, camera 100 may use one or more actuators, e.g., one or more VCM actuators, to implement the movement of image sensor 110. The actuators may include one or more magnets and corresponding one or more coils, the two of which may electromagnetically interact with each other to generate motive force (e.g., Lorentz force) to move image sensor 110 in a desired direction. For instance, as indicated in FIG. 1A, the actuators of camera 100 may include at least one magnet 135 (e.g., contained in magnet holder 155) and at least one corresponding coil 140. In this example, magnet 135 may be affixed with substrate 135 and thus be able to move together with substrate 135 and image sensor 110, whilst coil 140 may be affixed to a stationary component of camera 100 to stay spatially fixed. To increase magnitude of the motive force, in some embodiments, magnet 135 may be attached with substrate 125 but outside a perimeter of substrate 125, or still on substrate 125 but close to the perimeter or edge of substrate 125, such that magnet 135 may be positioned proximate coil 140. However, placement of magnet 135 at such locations may cause the adjacent portion of substrate 125 to become cantilevered with only partial support, as indicated in FIGS. 1A-1B.

In some embodiments, camera 100 may include frame structure 145. In some embodiments, frame structure 145 may be affixed with base structure 130 and at least a portion of frame structure 145 may be positioned between base structure 130 and magnet 135. For instance, as indicated in FIG. 1B, one portion of frame structure 145 may be seen underneath magnet 135 between magnet 135 and stationary base structure 130. In some embodiments, frame structure 145 may define a limit for travel of substrate 125, e.g., along Z-axis (thus also called a Z-stopper). In some embodiments, frame structure 145 may also prevent some rolling elements from dislodging from their raceway(s). At a normal condition in FIG. 1B, frame structure 145 may not necessarily be in contact with magnet 135 or magnet holder 155. However, as indicated in FIG. 1C, during a drop or shock event, substrate 125 of the sensor-shift structure of camera 100 may experience unwanted movement, given its degree of movement freedom. As magnet 135 is affixed with substrate 125, magnet 135 may also move unpurposely (e.g., moving up and down along Z-axis) which may cause deformation and excessive stress on the adjacent cantilevered portion of substrate 125. To reduce the stress, in some embodiments, frame structure 145 may include one or more raised regions, such as one or more portions of frame structure 145 underneath magnet 135 protruding towards magnet 135 (e.g., along Z-axis) to reduce gap 147 between magnet 135 and frame structure 145. This can reduce the extent of the unwanted movement of magnet 135 (e.g., along Z-axis), and thus lessen the resultant stress on substrate 125. Note that in some embodiments, other components (different from magnet 135) may be attached to substrate 125 and may also cause similar issues to substrate 125. As a result, the techniques described in this disclosure may be still applicable. For instance, in some embodiments, coil 140 (but not magnet 135) may be affixed with substrate 125 and cause at least a portion of substrate 125 to become cantilevered. Accordingly, one or more portions of frame structure 145 underneath coil 140 may be raised towards coil 140 to reduce the gap between frame structure 145 and coil 140 to mitigate the stress to the cantilevered portion of substrate 135 adjacent to coil 140, as described above.

FIG. 2 shows an exploded view for camera 100, according to some embodiments. In FIG. 2, image sensor 110 may be attached with substrate 125, the two of which may be affixed with bearing structure 170 via frame 180. As indicated in FIG. 2, in some embodiments, bearing structure 170 may include a plurality of rolling elements including rolling elements 175 that may suspend image sensor 110 and substrate 125 from base structure 130. Thus, bearing structure 170 (and image sensor 110 and substrate 125) may move on the plurality of rolling elements in one or more directions. The plurality of rolling elements may be balls or rollers (also called needle elements). In addition, camera 100 may include one or more actuators that may include magnets 136, 137, and 138, as well as coils 141, 142, and 143. In this example, magnets 136-138 may be attached with substrate 125 and thus be able to move together with substrate 125, whilst coils 141-143 may be affixed with yoke 185 that may be further attached with base structure 130. Optics holder 150 of camera 100 that contains lenses 105 and light folding element 115 may be attached with yoke 185. Thus, as described above, the electromagnetic interaction between magnets 136-138 and coils 141-143 may be able to move image sensor 110 and substrate 125 relative to the optical components of camera 100 in one or more directions. For instance, AF magnet 138 may operate with AF coil 143 to move the sensor-shift structure along Z-axis to perform AF, OIS magnets 136-137 may operate with OIS coils 141-142 to move the sensor-shift structure along X- and Y-axis respectively to implement OIS.

As indicated in FIG. 2, camera 100 may include frame structure 145 attached to the floor of base structure 130. In some embodiments, frame structure 145 may serve to limit the travel of substrate 125, e.g., along Z-axis (thus also called a Z-stopper). In some embodiments, frame structure 145 may also prevent some rolling elements from dislodging from their raceway(s). After assembly, at least a portion of frame structure 145 may be positioned underneath at least one of magnets 136-138 between the at least one magnet and base structure 130. In FIG. 2, frame structure 146 may include one or more raised regions 160 that may be underneath and protrude towards the at least one magnet. Further, since some components described above may sit at least partially inside base structure 130, camera 100 may need some spacing clearance between frame structure 145 and some proximate components. Thus, it may not necessarily be suitable to raise an entire portion of frame structure 145 towards the magnets, or increase thickness of the entire portion of frame structure 145. Instead, as indicated in FIG. 2, only one or more portions of frame 145 underneath a magnet may be raised to reduce a gap between frame structure 145 and the magnet. In some embodiments, raised regions 160 of frame structure 145 may be separated by un-raised regions and/or distributed at intervals along frame structure 145.

Figure 3:
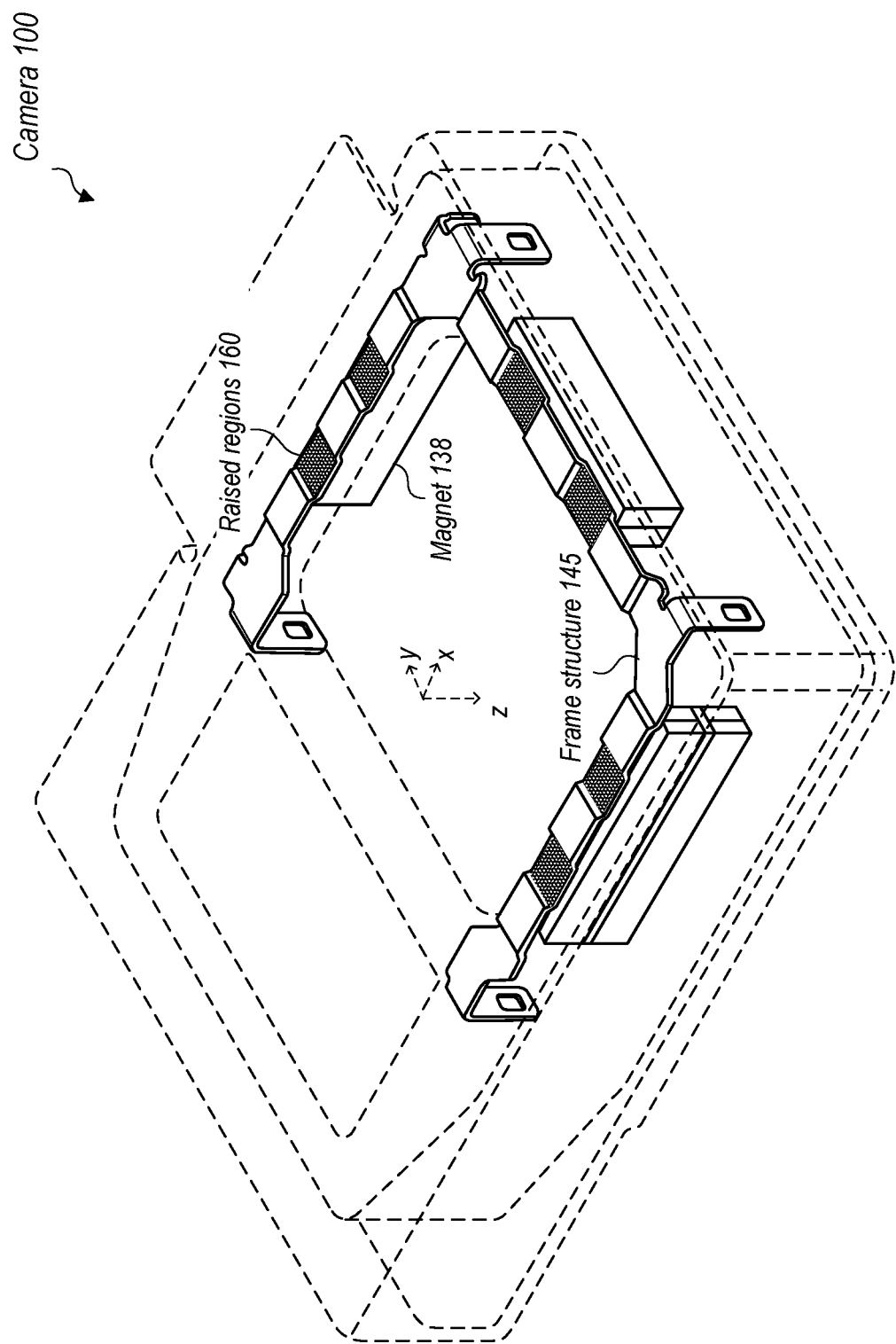
FIG. 3 shows a perspective view of an example camera, according to some embodiments.

FIG. 3 shows a perspective view of camera 100, according to some embodiments. In FIG. 3, camera 100 is viewed at an upside-down position with base structure 130 being removed. As indicated in the figure, frame structure 145 may include one or more raised regions 160 underneath one or more magnets that may protrude towards the magnets to reduce a gap between the magnets and frame structure 145. Further, in some embodiments, raised regions 160 may be formed in a specific pattern, e.g., separated by un-raised regions and/or distributed at intervals along frame structure 145. In some embodiments, frame structure 145 may be formed using one or more sheets of metal (e.g., stainless steel, copper alloy, etc.). In some embodiments, raised regions 160 may be formed using a stamping process. For instance, a sheet of metal may be pressed by a pressing tool to create raised regions 160 for frame structure 145. In some embodiments, punching, blanking, bending, coining, embossing, and flanging may all be stamping techniques used to shape the metal.

Figure 4:
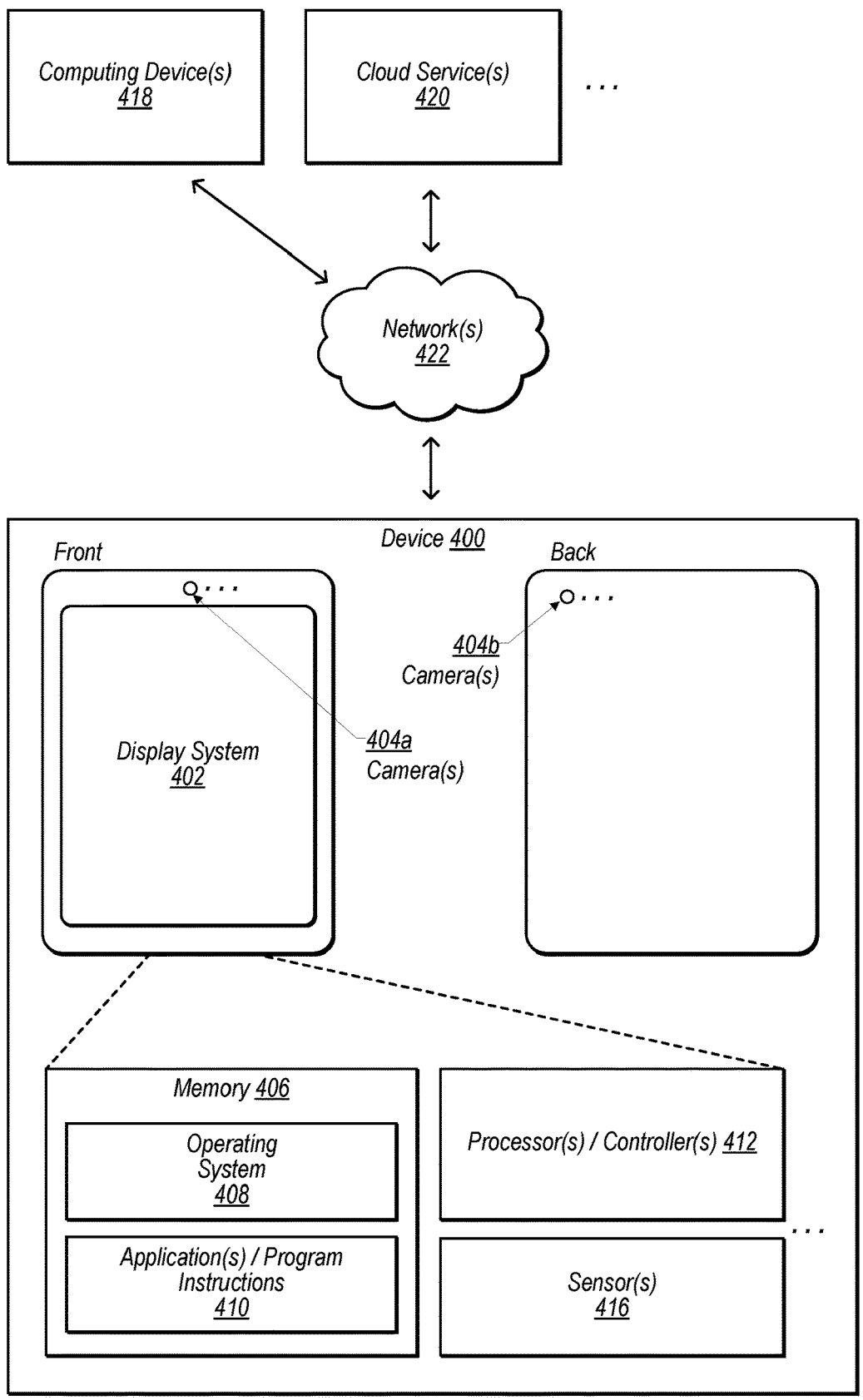
FIG. 4 shows a schematic representation of an example device that may include a camera having a frame structure with raised regions, according to some embodiments.

FIG. 4 illustrates a schematic representation of an example device 400 that may include a camera having a frame structure with raised regions, e.g., as described herein with reference to FIGS. 1-3, according to some embodiments. In some embodiments, the device 400 may be a mobile device and/or a multifunction device. In various embodiments, the device 400 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 400 may include a display system 402 (e.g., comprising a display and/or a touch-sensitive surface) and/or one or more cameras 404. In some non-limiting embodiments, the display system 402 and/or one or more front-facing cameras 404a may be provided at a front side of the device 400, e.g., as indicated in FIG. 4. Additionally, or alternatively, one or more rear-facing cameras 404b may be provided at a rear side of the device 400. In some embodiments comprising multiple cameras 404, some or all of the cameras may be the same as, or similar to, each other. Additionally, or alternatively, some or all of the cameras may be different from each other. In various embodiments, the location(s) and/or arrangement(s) of the camera(s) 404 may be different than those indicated in FIG. 4.

Among other things, the device 400 may include memory 406 (e.g., comprising an operating system 408 and/or application(s)/program instructions 410), one or more processors and/or controllers 412 (e.g., comprising CPU(s), memory controller(s), display controller(s), and/or camera controller(s), etc.), and/or one or more sensors 416 (e.g., orientation sensor(s), proximity sensor(s), and/or position sensor(s), etc.). In some embodiments, the device 400 may communicate with one or more other devices and/or services, such as computing device(s) 418, cloud service(s) 420, etc., via one or more networks 422. For example, the device 400 may include a network interface (e.g., network interface 510) that enables the device 400 to transmit data to, and receive data from, the network(s) 422. Additionally, or alternatively, the device 400 may be capable of communicating with other devices via wireless communication using any of a variety of communications standards, protocols, and/or technologies.

Figure 5:
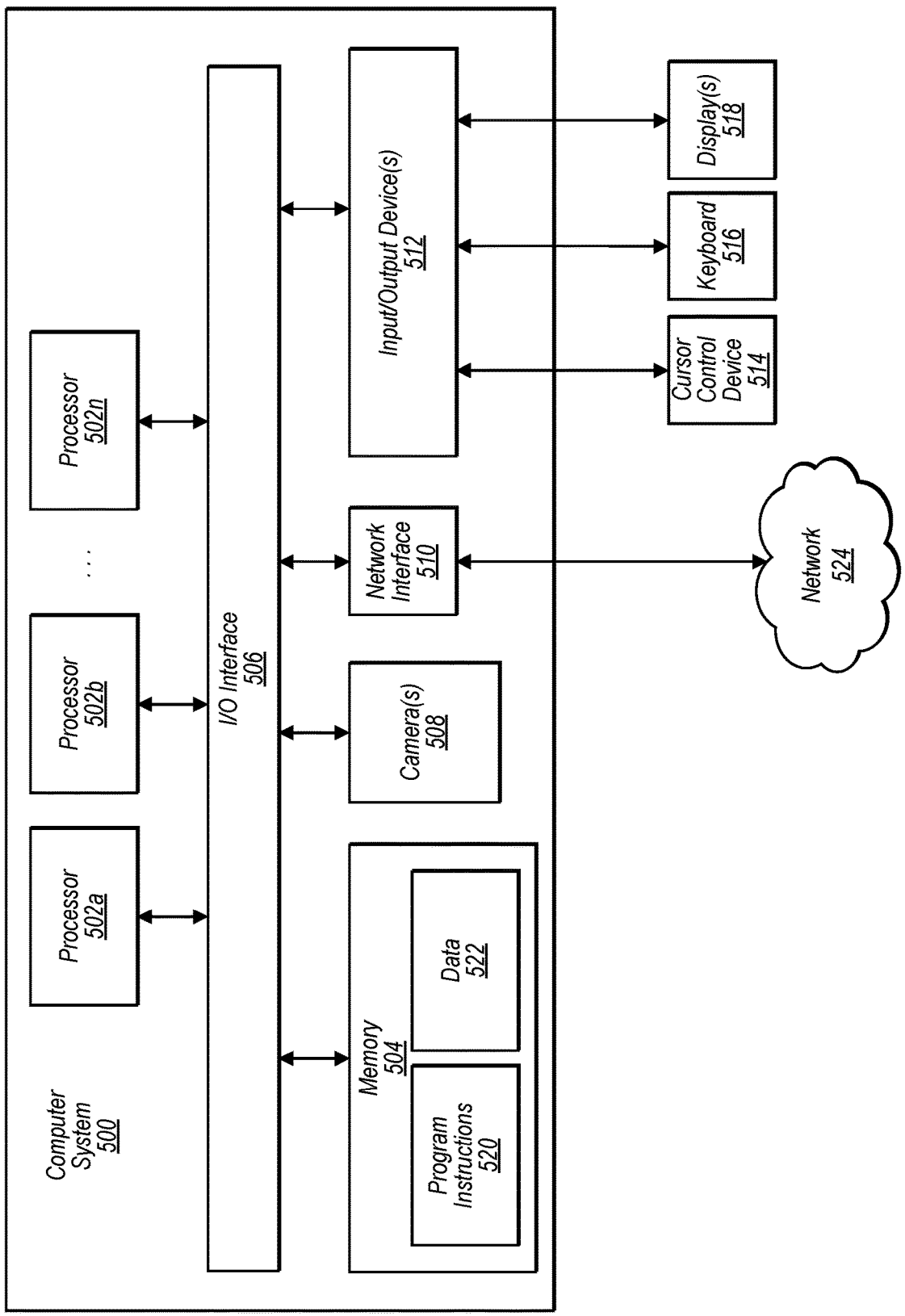
FIG. 5 shows a schematic block diagram of an example computer system that may include a camera having a frame structure with raised regions, according to some embodiments.

FIG. 5 illustrates a schematic block diagram of an example computing device, referred to as computer system 500, that may include or host embodiments of a camera having a frame structure with raised regions, e.g., as described herein with reference to FIGS. 1-4, according to some embodiments. In addition, computer system 500 may implement methods for controlling operations of the camera and/or for performing image processing images captured with the camera. In some embodiments, the device 400 (described herein with reference to FIG. 4) may additionally, or alternatively, include some or all of the functional components of the computer system 500 described herein.

The computer system 500 may be configured to execute any or all of the embodiments described above. In different embodiments, computer system 500 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 500 includes one or more processors 502 coupled to a system memory 504 via an input/output (I/O) interface 506. Computer system 500 further includes one or more cameras 508 coupled to the I/O interface 506. Computer system 500 further includes a network interface 510 coupled to I/O interface 506, and one or more input/output devices 512, such as cursor control device 514, keyboard 516, and display(s) 518. In some cases, it is contemplated that embodiments may be implemented using a single instance of computer system 500, while in other embodiments multiple such systems, or multiple nodes making up computer system 500, may be configured to host different portions or instances of embodiments. For example, in one embodiment some elements may be implemented via one or more nodes of computer system 500 that are distinct from those nodes implementing other elements.

In various embodiments, computer system 500 may be a uniprocessor system including one processor 502, or a multiprocessor system including several processors 502 (e.g., two, four, eight, or another suitable number). Processors 502 may be any suitable processor capable of executing instructions. For example, in various embodiments processors 502 may be general-purpose or embedded processors implementing any of a variety of instruction set architectures (ISAs), such as the x86, PowerPC, SPARC, or MIPS ISAs, or any other suitable ISA. Also, in some embodiments, one or more of processors 502 may include additional types of processors, such as graphics processing units (GPUs), application specific integrated circuits (ASICs), etc. In multiprocessor systems, each of processors 502 may commonly, but not necessarily, implement the same ISA. In some embodiments, computer system 500 may be implemented as a system on a chip (SoC). For example, in some embodiments, processors 502, memory 504, I/O interface 506 (e.g., a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 504 may be configured to store program instructions 520 accessible by processor 502. In various embodiments, system memory 504 may be implemented using any suitable memory technology, such as static random access memory (SRAM), synchronous dynamic RAM (SDRAM), nonvolatile/Flash-type memory, or any other type of memory. Additionally, existing camera control data 522 of memory 504 may include any of the information or data structures described above. In some embodiments, program instructions 520 and/or data 522 may be received, sent or stored upon different types of computer-accessible media or on similar media separate from system memory 504 or computer system 500. In various embodiments, some or all of the functionality described herein may be implemented via such a computer system 500.

In one embodiment, I/O interface 506 may be configured to coordinate I/O traffic between processor 502, system memory 504, and any peripheral devices in the device, including network interface 510 or other peripheral interfaces, such as input/output devices 512. In some embodiments, I/O interface 506 may perform any necessary protocol, timing or other data transformations to convert data signals from one component (e.g., system memory 504) into a format suitable for use by another component (e.g., processor 502). In some embodiments, I/O interface 506 may include support for devices attached through various types of peripheral buses, such as a variant of the Peripheral Component Interconnect (PCI) bus standard or the Universal Serial Bus (USB) standard, for example. In some embodiments, the function of I/O interface 506 may be split into two or more separate components, such as a north bridge and a south bridge, for example. Also, in some embodiments some or all of the functionality of I/O interface 506, such as an interface to system memory 504, may be incorporated directly into processor 502.

Network interface 510 may be configured to allow data to be exchanged between computer system 500 and other devices attached to a network 524 (e.g., carrier or agent devices) or between nodes of computer system 500. Network 524 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 510 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 512 may, in some embodiments, include one or more display terminals, keyboards, keypads, touchpads, scanning devices, voice or optical recognition devices, or any other devices suitable for entering or accessing data by one or more computer systems 500. Multiple input/output devices 512 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 510.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   one or more lenses;
   an image sensor attached with a substrate configured to move relative to the one or more lenses in one or more directions;
   an actuator configured to implement movement of the image sensor, wherein the actuator includes:
      at least one magnet attached with the substrate such that the at least one magnet moves with the image sensor; and
      at least one coil; and
   a frame structure stationary relative to the at least one magnet, wherein one or more portions of the frame structure protrude towards the at least one magnet to reduce a gap between the frame structure and the at least one magnet.

2. The system of claim 1, further comprising a bearing structure configured to suspend the substrate from a base structure, wherein the frame structure is affixed with the base structure and positioned between the base structure and the at least one magnet attached with the substrate, and wherein one or more portions of the frame structure protrude towards the at least one magnet.

3. The system of claim 2, wherein the bearing structure includes a first stage configured to move on a first group of the rolling elements to allow the image sensor to move relative to the one or more lenses in a first direction in parallel to an optical axis of the one or more lenses.

4. The system of claim 3, wherein the plurality of stages of the bearing structure includes a second stage configured to move on a second group of the rolling elements to allow the image sensor to move relative to the one or more lenses in a second direction orthogonal to the optical axis of the one or more lenses.

5. The system of claim 4, wherein the plurality of stages of the bearing structure includes a third stage suspended from the second stage via a third group of the rolling elements and configured to move on a third group of the rolling elements to allow the image sensor to move relative to the one or more lenses in a third direction orthogonal to the optical axis of the one or more lenses.

6. The system of claim 5, wherein the substrate is affixed to the third stage of the bearing structure.

7. The system of claim 1, wherein the frame structure is formed using one or more metal sheets.

8. The system of claim 7, wherein the one or more protruding portions of the frame structure is formed using a stamping process.

9. The system of claim 1, wherein the substrate includes at least one of a ceramic portion or an organic portion.

10. The system of claim 1, further comprising a light folding element placed optically between the one or more lenses and the image sensor and configured to reflect light passing through the one or more lenses to the image sensor.

11. A device, comprising:
   one or more processors;
   memory storing program instructions executable by the one or more processors to control operation of a camera module; and the camera module, comprising:
one or more lenses;
an image sensor attached with a substrate configured to move relative to the one or more lenses in one or more directions;
an actuator configured to implement movement of the image sensor,
wherein the actuator includes:
at least one magnet attached with the substrate such that the at least one magnet moves with the image sensor, and
at least one coil; and
a frame structure stationary relative to the at least one magnet, wherein one or more portions of the frame structure protrude towards the at least one magnet to reduce a gap between the frame structure and the at least one magnet.

12. The device of claim 11, further comprising a bearing structure configured to suspend the substrate from a base structure, wherein the frame structure is affixed with the base structure and positioned between the base structure and the at least one magnet attached with the substrate, and wherein one or more portions of the frame structure protrude towards the at least one magnet.

13. The device of claim 12, wherein the bearing structure includes a first stage configured to move on a first group of the rolling elements to allow the image sensor to move relative to the one or more lenses in a first direction in parallel to an optical axis of the one or more lenses.

14. The device of claim 13, wherein the plurality of stages of the bearing structure includes a second stage configured to move on a second group of the rolling elements to allow the image sensor to move relative to the one or more lenses in a second direction orthogonal to the optical axis of the one or more lenses.

15. The device of claim 14, wherein the plurality of stages of the bearing structure includes a third stage suspended from the second stage via a third group of the rolling elements and configured to move on a third group of the rolling elements to allow the image sensor to move relative to the one or more lenses in a third direction orthogonal to the optical axis of the one or more lenses.

16. The device of claim 15, wherein the substrate is affixed to the third stage of the bearing structure.

17. The device of claim 11, wherein the frame structure is formed using one or more metal sheets.

18. The device of claim 17, wherein the one or more protruding portions of the frame structure is formed using a stamping process.

19. The device of claim 11, wherein the substrate includes at least one of a ceramic portion or an organic portion.

20. The device of claim 11, wherein the camera module further comprises a light folding element positioned optically between the one or more lenses and the image sensor and configured to reflect light passing through the one or more lenses to the image sensor.

* * * * *